United States Patent
Ferris (10) Patent No.: US 8,977,750 B2
(45) Date of Patent: Mar. 10, 2015

(54) EXTENDING SECURITY PLATFORMS TO CLOUD-BASED NETWORKS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 818 days.

(21) Appl. No.: 12/391,802

(22) Filed: Feb. 24, 2009

(65) Prior Publication Data
US 2010/0217850 A1 Aug. 26, 2010

(51) Int. Cl.
*G06F 15/16* (2006.01)
*H04L 29/06* (2006.01)

(52) U.S. Cl.
CPC ..................................... *H04L 63/20* (2013.01)
USPC ............... 709/225; 709/203; 709/219; 726/7; 726/27

(58) Field of Classification Search
USPC .......... 705/8, 9, 51, 59; 709/1, 2, 3, 4, 6, 7, 9, 709/21, 27, 23, 219, 225; 726/203, 217, 726/218, 219, 223, 224, 225, 229, 6, 7, 27
See application file for complete search history.

(56) References Cited

U.S. PATENT DOCUMENTS

| | | | |
|---|---|---|---|
| 6,463,457 B1 | 10/2002 | Armentrout et al. | |
| 6,880,002 B2 * | 4/2005 | Hirschfeld et al. | ........... 709/223 |
| 6,888,834 B1 * | 5/2005 | Wood et al. | ............. 370/395.41 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,891,001 B1 * | 2/2011 | Greenawalt et al. | ............ 726/22 |
| 8,014,308 B2 * | 9/2011 | Gates et al. | .................... 370/252 |
| 8,041,946 B2 * | 10/2011 | Bunn et al. | ..................... 713/166 |
| 8,230,070 B2 * | 7/2012 | Buyya et al. | .................... 709/226 |
| 8,250,215 B2 * | 8/2012 | Stienhans et al. | ............. 709/227 |
| 8,296,178 B2 * | 10/2012 | Hudis et al. | .................... 370/401 |
| 8,307,177 B2 * | 11/2012 | Prahlad et al. | ................ 711/162 |
| 8,316,139 B2 * | 11/2012 | Klimentiev et al. | .......... 709/227 |
| 8,352,608 B1 * | 1/2013 | Keagy et al. | ..................... 709/226 |
| 8,364,638 B2 * | 1/2013 | Nickolov et al. | ............. 707/636 |

(Continued)

OTHER PUBLICATIONS

Foster, I. et al. "Cloud Computing and Grid Computing 360 Degree Compared," Grid Computing Environments (GCE) Workshop, Nov. 12-16, 2008, pp. 1-10.*

(Continued)

*Primary Examiner* — Melvin H Pollack
(74) *Attorney, Agent, or Firm* — Lowenstein Sandler LLP (57) ABSTRACT

Embodiments relate to systems and methods for extending a network security platform to a cloud-based network. A set of managed machines, such as personal computers or servers, can be managed by a network security engine. The network security engine can govern access to and operation of the set of managed machines through a set of security policies. According to embodiments, the set of security policies can be sub-divided into a partitioned security class corresponding to a subset of the managed network which is intended to be deployed as a cloud-accessible subset of the overall managed network. The partitioned security class can specify access restrictions for the cloud-accessible subset to receive resources from or provide resources to the external cloud environment. A corporate campus network or other managed network can therefore permit access of the cloud to some or all of its machines, while still maintaining desired local security conditions.

20 Claims, 5 Drawing Sheets

(56) References Cited

U.S. PATENT DOCUMENTS

| | | | |
|---|---|---|---|
| 8,370,838 B1* | 2/2013 | Omelyanchuk et al. | 718/1 |
| 8,474,032 B2* | 6/2013 | Fetik | 726/11 |
| 8,514,868 B2* | 8/2013 | Hill | 370/401 |
| 8,516,552 B2* | 8/2013 | Raleigh | 726/2 |
| 8,539,589 B2* | 9/2013 | Prafullchandra et al. | 726/25 |
| 8,547,872 B2* | 10/2013 | Raleigh | 370/252 |
| 8,549,096 B2* | 10/2013 | Gulley et al. | 709/216 |
| 8,549,281 B2* | 10/2013 | Samovskiy et al. | 713/151 |
| 8,589,372 B2* | 11/2013 | Krislov | 707/705 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0105810 A1* | 6/2003 | McCrory et al. | 709/203 |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0138204 A1* | 6/2005 | Iyer et al. | 709/242 |
| 2005/0144060 A1* | 6/2005 | Chen et al. | 705/9 |
| 2005/0182727 A1* | 8/2005 | Robert et al. | 705/51 |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1* | 4/2006 | Bruck et al. | 725/86 |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0082693 A1* | 4/2008 | Meijer et al. | 709/247 |
| 2008/0083025 A1* | 4/2008 | Meijer et al. | 726/9 |
| 2008/0083040 A1 | 4/2008 | Dani et al. | |
| 2008/0086727 A1 | 4/2008 | Lam et al. | |
| 2008/0091613 A1* | 4/2008 | Gates et al. | 705/59 |
| 2008/0104608 A1 | 5/2008 | Hyser et al. | |
| 2008/0104699 A1* | 5/2008 | Gounares et al. | 726/22 |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1* | 5/2009 | Surtani et al. | 709/224 |
| 2009/0177514 A1* | 7/2009 | Hudis et al. | 705/8 |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0011432 A1* | 1/2010 | Edery et al. | 726/11 |
| 2010/0042720 A1* | 2/2010 | Stienhans et al. | 709/226 |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0281273 A1* | 11/2010 | Lee et al. | 713/190 |
| 2010/0299366 A1 | 11/2010 | Stienhans et al. | |
| 2011/0016214 A1 | 1/2011 | Jackson | |
| 2011/0061046 A1* | 3/2011 | Phillips | 717/176 |
| 2011/0131335 A1 | 6/2011 | Spaltro et al. | |
| 2011/0167474 A1* | 7/2011 | Sinha et al. | 726/1 |
| 2012/0005724 A1* | 1/2012 | Lee | 726/1 |
| 2012/0290702 A1* | 11/2012 | Vincent | 709/223 |
| 2013/0145422 A1* | 6/2013 | Raleigh | 726/1 |
| 2013/0204971 A1* | 8/2013 | Brandwine et al. | 709/217 |

OTHER PUBLICATIONS

Rimal, B. P. et al. "A Taxonomy and Survey of Cloud Computing Systems," 5th International Joint Conference on INC, IMS and IDC (NCM), Aug. 25-27, 2009, pp. 44-51.*

Raj, Himanshu et al. "Resource Management for Isolation Enhanced Cloud Services," Proceedings of the 2009 ACM Workshop on Cloud Computing Security (CCSW), 2009, pp. 77-84.*

Descher, M. et al. "Retaining Data Control to the Client in Infrastructure Clouds," Intl Conference on Availability, Reliability and Security (ARES), Mar. 16-19, 2009, pp. 9-16.*

Vouk, Mladen. "Cloud Computing—Issues, Research and Implementations," Journal of Computing and Information Technology (CIT), vol. 16, Issue 4, 2008, pp. 235-246.*

Ristenpart, Thomas et al. "Hey, You, Get Off of my Cloud: Exploring Information Leakage in Third Party Compute Clouds," Proceedings of the 16th ACM Conference on Computer and Communications Security (CCS), 2009, pp. 199-212.*

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan, "Methods and Systems for Abstracting Cloud Management", U.S. Appl. No. 12/474,113, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

(56) References Cited

OTHER PUBLICATIONS

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al, "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/190,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris et al., "Systems and Methods for Combinatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris at al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

(56) References Cited

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud installation information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

* cited by examiner

EXTENDING SECURITY PLATFORMS TO CLOUD-BASED NETWORKS

FIELD

The present teachings relate to systems and methods for extending security platforms to cloud-based networks, and more particularly to platforms and techniques for extending the security policies for managed networks to partitions of the network that are exposed to or incorporated in external cloud networks.

BACKGROUND OF RELATED ART

The advent of cloud-based computing architectures has opened new possibilities for the rapid, and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application. Another type of software entity that has found certain application in certain spaces is software appliances, which generally speaking can represent relatively self-contained software installations including full or customized partial operating system installations, combined with selected applications in a single installation or update package.

Currently, a network operator can manage a set of machines within a conventional network using known network management platforms, such as the commercially available Tivoli™ platform provided by IBM Corp. or other platforms. Current known network management platforms do not, however, incorporate the ability to extend network management functions to machines within the network that are exposed to an external could, either by way of supplying resources to the cloud or consuming resources from the cloud. Currently, no mechanism exists for systems administrators to adapt for the special circumstances and parameters required to securely maintain a subset of machines within a managed network that are exposed to the cloud. Thus, there is a need in the art for methods and systems that provide extensions of security services to machines under network management that may communicate with or form a part of an external cloud or clouds.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for systems and methods for extending security platforms to cloud-based networks. More particularly, embodiments relate to platforms and techniques for extending the security functions of network management platforms or other security engines to permit a subset or all of a managed network to be exposed to an external cloud environment, without compromising the security policies ordinarily in place for the managed network for internal operation. In terms of operational environments, a security management engine can communicate with a set of managed machines, such as personal computers, servers, virtual machines, and/or other devices, and manage the security of those machines under the supervision of that platform. A security management engine can establish a set of security policies for managed machines in its domain. The set of security policies can contain security parameters such as one or more access control lists, authentication criteria, access control parameters for processor, storage, or memory limits for individual users or groups of users, permitted schedules for defined tasks or services, and/or other security functions. According to embodiments, the security management engine can establish and maintain a set of default security policies for use in regular network operations, such as regular wired or wireless network operations on a corporate campus or other facility. According to embodiments, the security management engine can further establish and maintain a partitioned security class within the set of security policies to govern machines in the managed network that communicate with or form part of an external cloud environment. The partitioned security class can identify machines Which are configured to communicate with or form part of an external cloud environment, and specify a set of security policies or rules specific to a cloud scenario.

The partitioned security class can, for example, specify that a cloud-qualified partition within the set of managed machines be made available to an external cloud for processor harvesting between 12:00 am and 7:00 am on given days of the week, to permit the harvesting of processor throughput by a cooperating external cloud during low-use intervals. The partitioned security class can, for the time that the cloud-qualified partition of the managed network is communicating with the external cloud, specify that access to the internal databases or storage of the managed network be turned off for the machines participating in the cloud environment, or that user profiles for participating machines be blocked or hidden from view by the cloud. Other security configurations can be specified for or in the partitioned security class. A set of machines within a managed network can therefore be deployed to or retrieve resources from the cloud, while maintaining the security of the internal network with which participating machines are normally associated.

Embodiments of the present teachings thereby relate to systems and methods which operate in a managed network environment interacting with cloud computing networks. More particularly, embodiments relate to platforms and techniques in which a cloud environment extracts resources from or provides resources to a managed network, such as an internal corporate, academic, or other network, under the control of a network security engine configured to adapt multiple security classes to cloud-based activities.

Reference will now be made in detail to exemplary embodiments of the present teachings, which are illustrated in the accompanying drawings. Where possible the same reference numbers will be used throughout the drawings to refer to the same or like parts.

Figure 1:
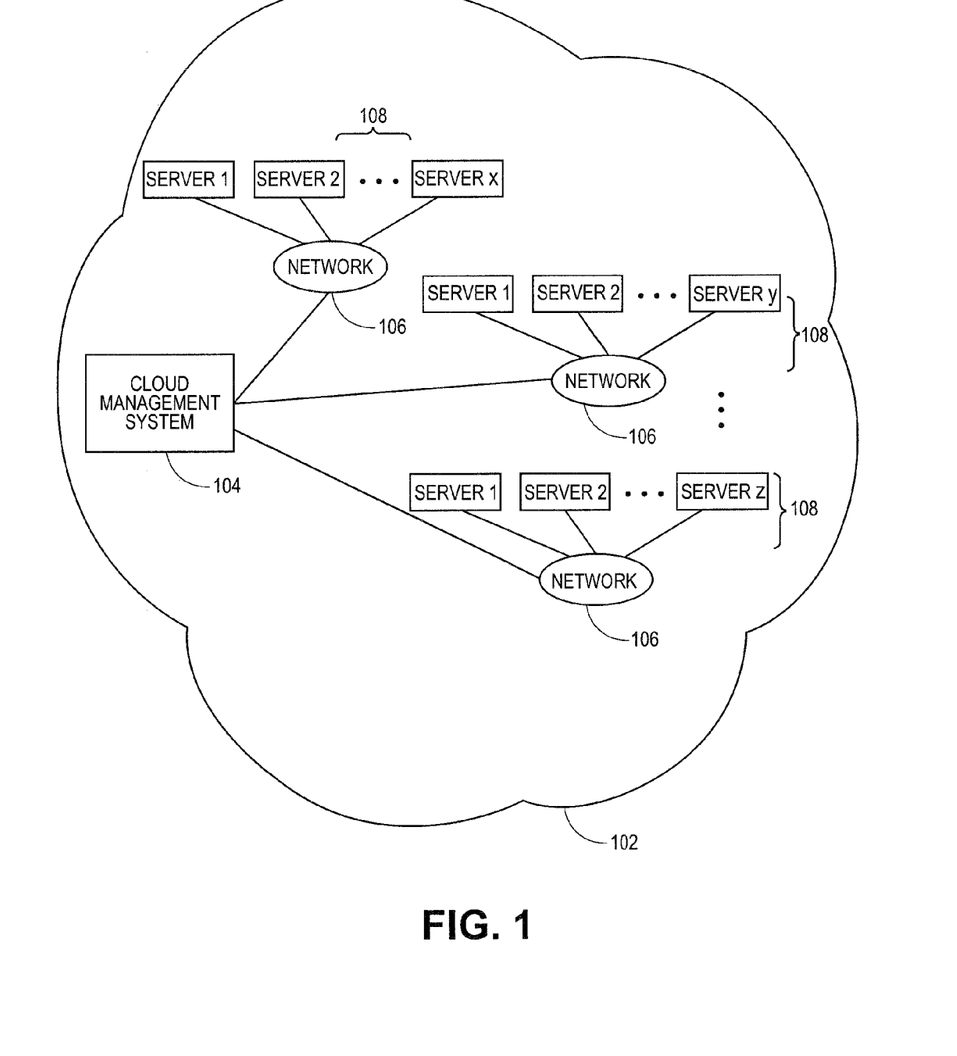
FIG. 1 illustrates an overall cloud system architecture in which various embodiments of the present teachings can be practiced.

FIG. 1 illustrates an overall cloud computing environment, in which systems and methods for extending security platforms to cloud-based networks, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
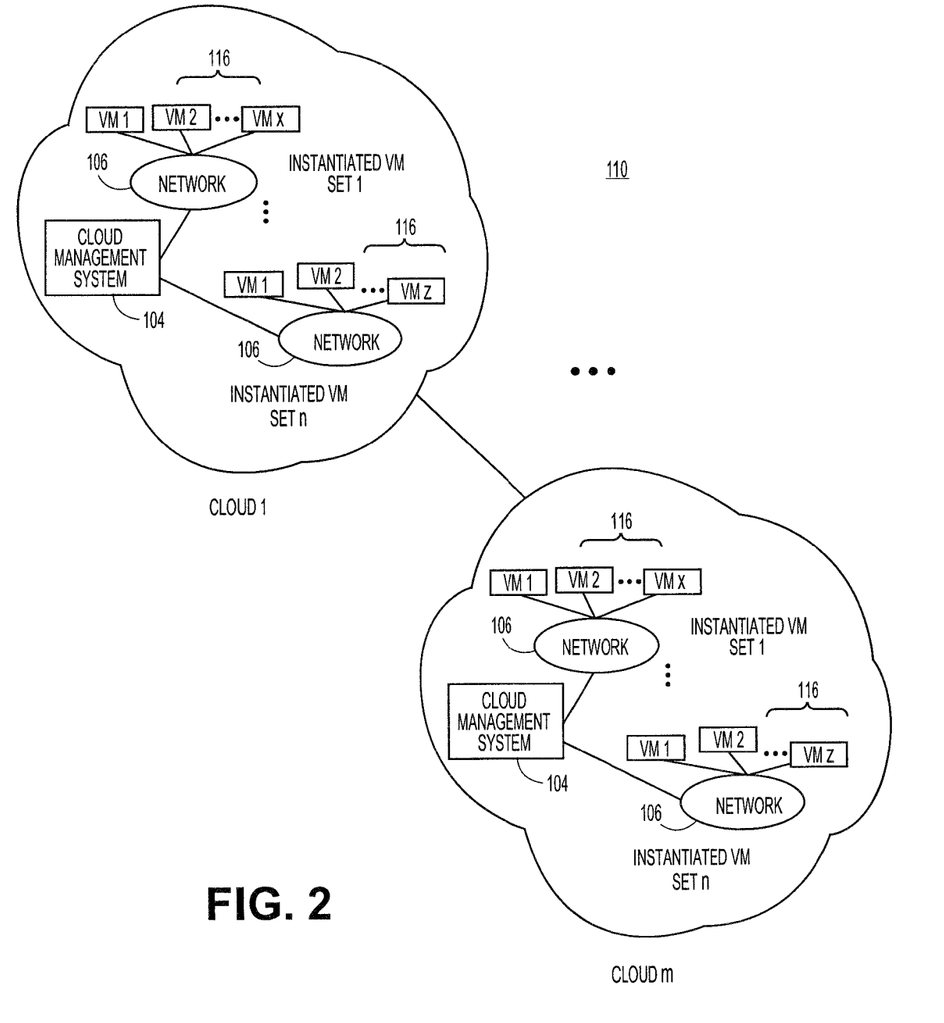
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
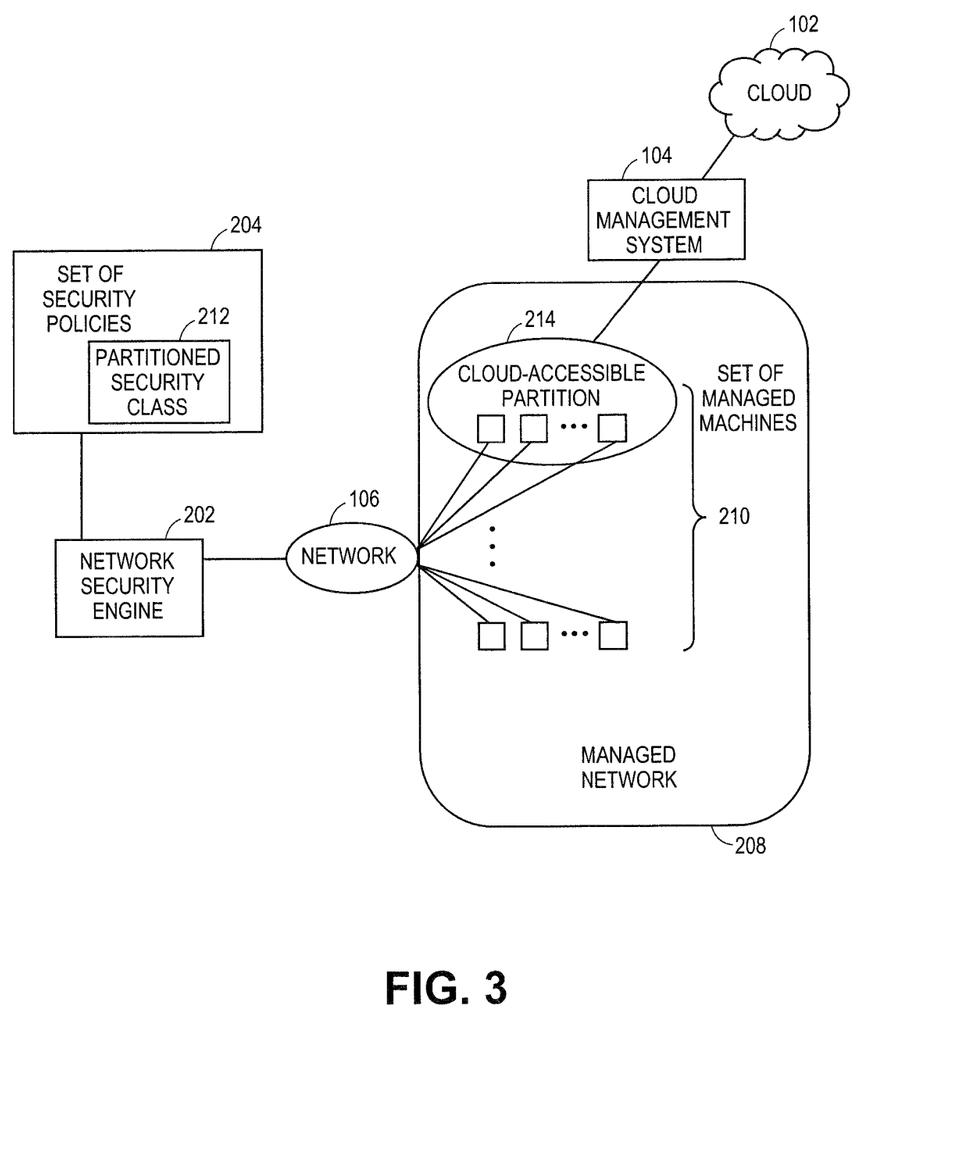
FIG. 3 illustrates an overall environment in which systems and methods for extending security platforms to cloud-based networks can operate, according to various embodiments.

FIG. 3 illustrates aspects of a network security engine 202 and its interaction with one or more external cloud 102 to manage a managed network 208, according to various embodiments. In embodiments as shown, a network security engine 202 can communicate with a managed network 208 under its administrative and security control. Managed network 208 can communicate with network security engine 202 through one or more networks 106, or other networks or connections. Managed network 208 can comprise a set of managed machines 210, such as personal computers, servers, workstations, and/or other resources. Managed network 208 in embodiments can include or consist of a local area network, a metropolitan area network, a wide area network, a wired network, a wireless network, a virtual private network, and/or other types of networks or connections. In embodiments, managed network 208 can be or include a campus-type network installation, such as an Ethernet domain or other network installed within a set of local buildings or facilities. Managed network 208 can comprise other types or configurations of networks. Set of managed machines 210 can, in embodiments, comprise hardware or virtualized machines. In configurations as shown, network security engine 202 can establish, access, and/or manage a set of security policies 204 to govern managed network 208 and its constituent machines.

In embodiments as shown, network security engine 202 and/or other logic or entities can designate, access, and/or configure, a cloud-accessible partition 214 to expose to one or more external cloud 102. In embodiments, the cloud-accessible partition 214 can comprise a set of machines identified to be partially or fully dedicated, exposed, and/or made available to one or more cloud 102. In embodiments, cloud-accessible partition 214 can be configured to provide hardware, software, and/or other resources to one or more cloud 102, and/or to receive similar resources from one or more cloud 102. In embodiments, cloud-accessible partition 214 can communicate or register with one or more cloud 102 via cloud management system 204, and/or other intermediate entities or logic. In embodiments, cloud-accessible partition 214 can be initiated or configure by or via one or more constituent machine in managed network 208, cloud management system 104, by network security engine 202, and/or other logic or entities.

According to various embodiments, a dedicated partitioned security class 212 can be established in set of security policies 204 to specially govern the operation of cloud-accessible partition 214. In embodiments, partitioned security class 212 can be generated by network security engine 202. Partitioned security class 212 can reflect security policies directed to the maintenance of cloud-accessible partition 214 in its interaction with one or more cloud 102. In embodiments, partitioned security class 212 can automatically default to baseline policies for managed network 208 or other policies set in set of security policies 204, when constituent machines of cloud-accessible partition 214 are not connected to or communicating with one or more cloud 102.

When machines in cloud-accessible partition 214 are actively communicating with one or more cloud 102 or at other times, the participating machines in that partition can be governed via network security engine 202 using partitioned security class 212. According to embodiments, partitioned security class 212 can host or contain policies, rules, and/or other parameters or logic to govern the operation of cloud-accessible partition 214 and the interaction of cloud-accessible partition 214 and one or more cloud 102.

For instance, partitioned security class 212 can contain policies related to or specifying limitations or conditions on the availability or use of resources such as processor cycles, memory access, storage access, input/output bandwidth, scheduled access time, access to user profile data, access to, copying or execution rights for applications or other software, and/or the conditional delivery or use of other resources of cloud-accessible partition 214 by or via one or more cloud 102. In embodiments, partitioned security class 212 can set limits or conditions on the consumption of inbound resources from one or more cloud 102 to cloud-accessible partition. In embodiments, the assigned of machines in managed network 208 to cloud-accessible partition 214 can be dynamic, and change over time. The security policies contained in partitioned security class 212 can be updated when the cloud-accessible partition 214 is updated, or at other times. In embodiments, multiple cloud-accessible partitions can be created in managed network 208. In embodiments, multiple cloud-accessible partitions can be governed by the same partitioned security class 212, or by different classes and associated security policies. In embodiments, set of security policies 204 can be configured to take precedence over partitioned security class 212 when a conflict or overlap occurs, or vice versa.

Figure 4:
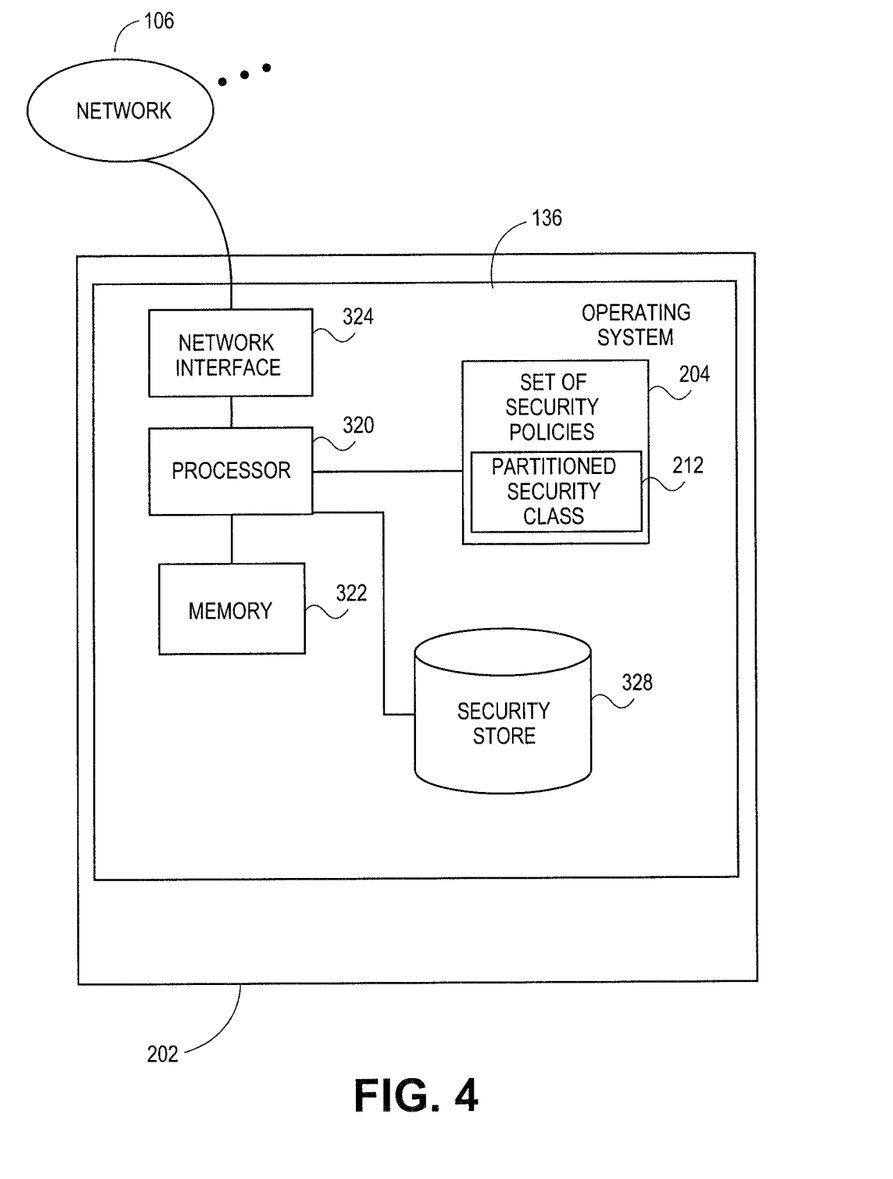
FIG. 4 illustrates an exemplary diagram of hardware and other resources that can be incorporated into a network security engine according to various embodiments.

FIG. 4 illustrates an exemplary diagram of hardware and other resources that can be incorporated in a network security engine 202 configured to communicate with managed network 208, one or more external cloud 102, and other resources according to embodiments. In embodiments as shown, the network security engine 202 can comprise a processor 320 communicating with memory 322, such as electronic random access memory, operating under control of or in conjunction with operating system 326. Operating system 326 can be, for example, a distribution of the Linux™ operating system, the Unix™ operating system, or other open-source or proprietary operating system or platform. Processor 320 also communicates with a security store 328, such as a database stored on a local hard drive. Processor 320 further communicates with network interface 324, such as an Ethernet or wireless data connection, which in turn communicates with one or more networks 106, such as the Internet or other public or private networks. Processor 320 also communicates with set of security policies 204, including partitioned security class 212, to execute control logic and perform cross-network security processes described herein. Other configurations of the network security engine 202, associated network connections, and other hardware and software resources are possible. While FIG. 4 illustrates the network security engine 202 as a standalone system comprises a combination of hardware and software, the network security engine 202 can also be implemented as a software application or program capable of being executed by a conventional computer platform. Likewise, the network security engine 202 can also be implemented as a software module or program module capable of being incorporated in other software applications and programs. In either case, the network security engine 202 can be implemented in any type of conventional proprietary or open-source computer language.

Figure 5:
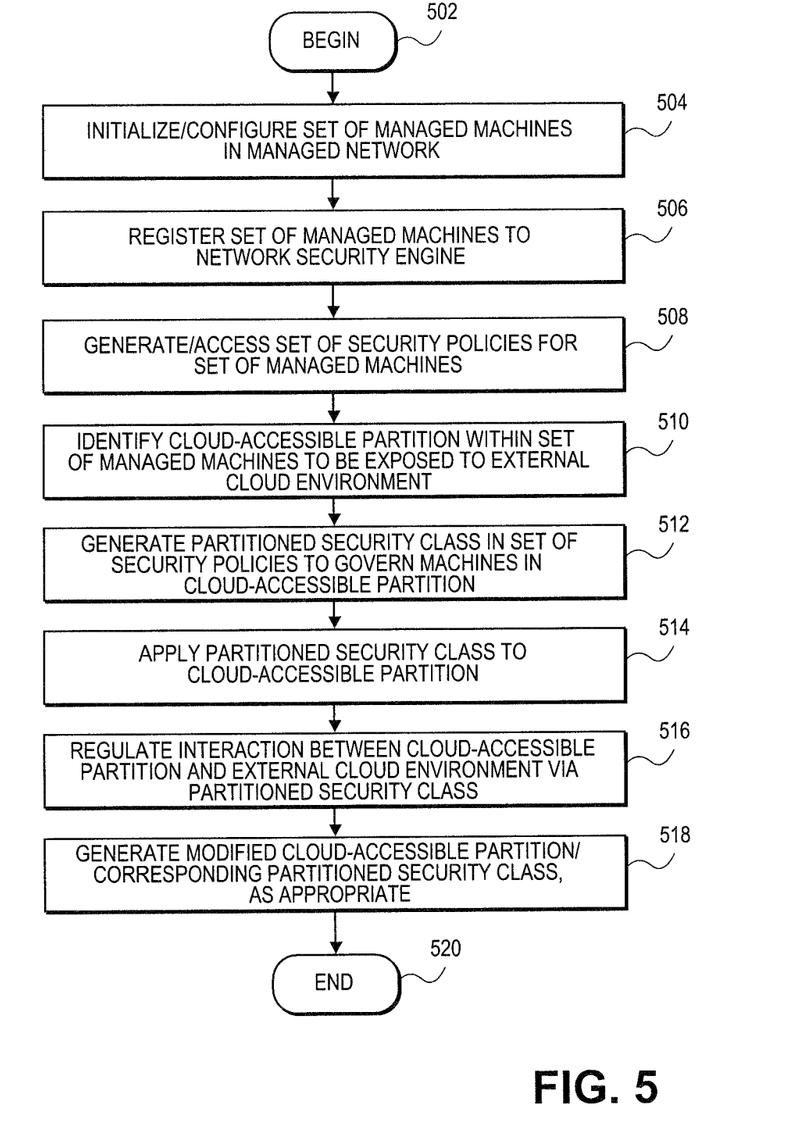
FIG. 5 illustrates an overall flowchart for security processing in systems and methods for extending security platforms to cloud-based networks, according to various embodiments.

FIG. 5 illustrates a flowchart of processing for extending security platforms to a cloud-based network, according to various embodiments. In 502, processing can begin. In 504, set of managed machines 210 can be initialized or configured in managed network 208 via network security engine 202 and/or other resources or entities. In 506, set of managed machines 210 in managed network 208 can be registered to network security engine 202. In embodiments, machines can be identified and registered using physical and/or logical identifiers, such as a MAC (media access control) address or other identifier. In 508, a set of security policies 204 can be generated and/or accessed by network security engine 202 for set of managed machines. Set of security policies 204 can, in general, provide parameters by which access to, or the operation of, set of managed machines 210 will be conducted, including, for instance, access policies for memory or storage, user authentication requirements, network access privileges, and/or other control policies.

In 510, a cloud-accessible partition 214 within set of managed machines 210 can be identified to be exposed to the external cloud environment of one or more cloud 102. In embodiments, the cloud-accessible partition 214 can be configured to provide or release resources to one or more cloud 102, such as, for example, processor cycles, memory, storage, communications bandwidth, applications, and/or other hardware, software, and/or other resources. In embodiments, the cloud-accessible partition 214 can be configured to receive or consume resources from one or more cloud 102. In embodiments, the cloud-accessible partition 214 can be configured to both provide to and extract resources from one or more cloud 102.

In 512, the network security engine 202 can generate a partitioned security class 212 in set of security policies 204, to regulate the operation of the machines in cloud-accessible partition 214. According to embodiments, partitioned security class 212 can host or contain policies, rules, and/or other parameters or logic to govern the operation of cloud-accessible partition 214 and the interaction of cloud-accessible partition 214 and one or more cloud 102. For instance, cloud-accessible partition 214 can contain policies related to or specifying limitations or conditions on the availability or use of processor cycles, memory access, storage access, input/output bandwidth, scheduled access time, access to, copying or execution rights for applications or other software, access to user profile data, and/or the conditional use of other resources of cloud-accessible partition 214 by or via one or more cloud 102.

In 514, partitioned security class 212 can be applied to cloud-accessible partition 214 via network security engine 202. In 516, the interaction between cloud-accessible partition 214 and one or more cloud 102 can be regulated via partitioned security class 212 and its associated policies and logic. For instance, network security engine 202 can restrict access of one or more cloud 102 to cloud-accessible partition 214 to comparatively low-usage periods of managed network 208 such as overnight, weekend, or other periods. For further instance, partitioned security class 212 can prevent access to local storage of machines in cloud-accessible partition 214 by one or more cloud 102, or require specified levels of authentication to allow access to those or other resources.

In 518, a modified or updated cloud-accessible partition 214, along with any corresponding partitioned security class 212, can be generated or identified, as appropriate. For instance, cloud management system 104 associated with one or more cloud 102 can transmit a request for addition resources to managed network 208 and/or network security engine 202 or other entities, based on increased demand, in response to which additional machines can be dedicated to cloud-accessible partition 214. In 520, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single network security engine 202 manages the security of managed network 208, in embodiments, multiple security engines, servers, or other entities can cooperate to perform security functions. For further example, while embodiments have been described in which one cloud-assigned partition 214 communicates with or receives resources from one or more cloud 102, in embodiments, multiple subnets or partitions or managed network 208 can be configured to interact with one or more cloud 102. Other resources described as singular or integrated in some embodiments can in embodiments be plural or distributed, and resources described as embodiments as multiple or distributed can in embodiments be combined. The scope of the present teachings is accordingly intended to be limited only by the following claims.

What is claimed is:

1. A method, comprising:
generating a set of security policies for a set of managed machines in a network; identifying a cloud-accessible subset of the set of managed machines to be used as a shared resource by an external cloud environment;
identifying a first subset of security policies within the set of security policies, the first subset of security policies corresponding to a set of access conditions for the cloud-accessible subset of the set of managed machines;
identifying a second subset of baseline security policies within the set of security policies to apply to the cloud-accessible subset of the set of managed machines when the cloud-accessible subset of the set of managed machines are not exposed to the external cloud environment;
generating, by a processor, a partitioned security class in the set of security policies that includes the first subset of security policies corresponding to the set of access conditions for the cloud-accessible subset of the set of managed machines; and in response to determining that the cloud-accessible subset of the set of managed machines is exposed to the external cloud environment, applying the partitioned security class to the subset of the set of managed machines, wherein the partitioned security class permits sharing of the cloud-accessible subset of the set of managed machines with the external cloud environment based on the first subset of security policies.

2. The method of claim 1, wherein the network comprises at least one of a local area network, a metropolitan area network, or a wide area network.

3. The method of claim 1, wherein the network comprises at least one of a wired network or a wireless network located in a single campus.

4. The method of claim 1, wherein the sharing of the cloud-accessible subset with the external could environment comprises at least one of providing resources from the cloud-accessible subset to the external cloud environment or receiving resources from the external cloud environment in the cloud-accessible subset.

5. The method of claim 1, wherein the set of access conditions comprises at least one of limitations on processor cycles, limitations on memory access, limitations on storage access, limitations on input/output bandwidth, limitations on scheduled access time, limitations on use of applications, or limitations on access to user profile data.

6. The method of claim 1, wherein the cloud-accessible subset comprises a dynamically selectable cloud-accessible subset of the set of managed machines.

7. A computer system, comprising:
a memory component; and
a processor coupled to the memory component, wherein the processor is to:
generate a set of security policies for a set of managed machines in a managed network;
identify a cloud-accessible subset of the set of the managed machines to be used as a shared resource by an external cloud environment;
identify a first subset of security policies within the set of security policies, the first subset of security policies corresponding to a set of access conditions for the cloud-accessible subset of the set of managed machines;
identify a second subset of baseline security policies within the set of security policies to apply to the cloud-accessible subset of the set of managed machines when the cloud-accessible subset of the set of managed machines are not exposed to the external cloud environment;
generate a partitioned security class in the set of security policies that includes the first subset of security policies corresponding to the set of access conditions for the cloud- accessible subset of the set of managed machines; and
in response to determining that the cloud-accessible subset of the set of managed machines is exposed to the external cloud environment, apply the partitioned security class to the subset of the set of managed machines, wherein the partitioned security class permits sharing of the cloud-accessible subset of the set of managed machines with the external cloud environment based on the first subset of security policies.

8. The computer system of claim 7, wherein the managed network comprises at least one of a local area network, a metropolitan area network, or a wide area network.

9. The computer system of claim 7, wherein the managed network comprises at least one of a wired network or a wireless network located in a single campus.

10. The computer system of claim 7, wherein the sharing of the cloud-accessible subset with the external could environment comprises at least one of providing resources from the cloud-accessible subset to the external cloud environment or receiving resources from the external cloud environment in the cloud-accessible subset.

11. The computer system of claim 7, wherein the set of access conditions comprises at least one of limitations on processor cycles, limitations on memory access, limitations on storage access, limitations on input/output bandwidth, limitations on scheduled access time, limitations on use of applications, or limitations on access to user profile data.

12. The computer system of claim 7, wherein the cloud-accessible subset comprises a dynamically selectable cloud-accessible subset of the set of managed machines.

13. A non-transitory computer readable medium programmed to include instructions that, when executed by a processor, cause the processor to:
generate a set of security policies for a set of managed machines in a network;
identify a cloud-accessible subset of the set of managed machines to be used as a shared resource by an external cloud environment;
identify a first subset of security policies within the set of security policies, the first subset of security policies corresponding to a set of access conditions for the cloud-accessible subset of the set of managed machines;
identify a second subset of baseline security policies within the set of security policies to apply to the cloud-accessible subset of the set of managed machines when the cloud-accessible subset of the set of managed machines are not exposed to the external cloud environment;
generate a partitioned security class in the set of security policies that includes the first subset of security policies corresponding to the set of access conditions for the cloud-accessible subset of the set of managed machines; and
in response to determining that the cloud-accessible subset of the set of managed machines is exposed to the external cloud environment, apply the partitioned security class to the subset of the set of managed machines, wherein the partitioned security class permits sharing of the cloud-accessible subset of the set of managed machines with the external cloud environment based on the first subset of security policies.

14. The non-transitory computer readable medium of claim 13, wherein the network comprises at least one of a local area network, a metropolitan area network, or a wide area network.

15. The non-transitory computer readable medium of claim 13, wherein the network comprises at least one of a wired network or a wireless network located in a single campus.

16. The non-transitory computer readable medium of claim 13, wherein the sharing of the cloud-accessible subset with the external could environment comprises at least one of providing resources from the cloud-accessible subset to the external cloud environment or receiving resources from the external cloud environment in the cloud-accessible subset.

17. The non-transitory computer readable medium of claim 13, wherein the set of access conditions comprises at least one of limitations on processor cycles, limitations on memory access, limitations on storage access, limitations on input/output bandwidth, limitations on scheduled access time, limitations on use of applications, or limitations on access to user profile data.

18. The method of claim 1, further comprising:
in response to determining that the cloud-accessible subset of the set of managed machines is not exposed to the external cloud environment, applying the second subset of baseline security policies to the cloud-accessible subset of the set of managed machines.

19. The system of claim 8, wherein the processor is further to:
in response to determining that the cloud-accessible subset of the set of managed machines is not exposed to the external cloud environment, apply the second subset of baseline security policies to the cloud-accessible subset of the set of managed machines.

20. The non-transitory computer readable medium of claim 15, wherein the instructions, when executed by the processor, further cause the processor to:
in response to determining that the cloud-accessible subset of the set of managed machines is not exposed to the external cloud environment, apply the second subset of baseline security policies to the cloud-accessible subset of the set of managed machines.

\* \* \* \* \*